US005335148A

United States Patent [19]

Tominaga

[11] Patent Number: 5,335,148

[45] Date of Patent: Aug. 2, 1994

[54] ILLUMINATED KNOB DEVICE

[75] Inventor: Shuusuke Tominaga, Hyogo, Japan

[73] Assignee: Mitsubishi Denki Kabushiki Kaisha, Hyogo, Japan

[21] Appl. No.: 10,367

[22] Filed: Jan. 28, 1993

[30] Foreign Application Priority Data

Jan. 31, 1992 [JP] Japan .................................... 4-45895

[51] Int. Cl.[5] .............................................. G01D 11/28

[52] U.S. Cl. ......................................... 362/26; 362/27; 362/32

[58] Field of Search ............................... 362/32, 26, 27

[56] References Cited

U.S. PATENT DOCUMENTS 2,831,453 4/1958 Hardesty ............................. 362/26

5,093,764 3/1992 Hasegawa et al. .................. 362/26

FOREIGN PATENT DOCUMENTS 2035719 3/1981 Fed. Rep. of Germany .

3-24232 7/1989 Japan .

*Primary Examiner*—Carroll B. Dority

[57] ABSTRACT

An object of the present invention is to improve the manipulating property of a rotary knob device. According to the present invention, a variable resistor and switch has an inner unrotatable shaft, and an outer rotatable shaft. A first manipulation member having a light guide portion, a light bending portion and a luminous portion is coupled to the inner shaft. A sign indicative of the method of manipulation of the resistor and switch, and a sign indicative of the function thereof are provided on the luminous portion. The luminous portion is illuminated to make the signs clearly visible. The signs provided on the first manipulation member fitted on the inner unrotatable shaft are illuminated with the luminous portion of the member so that the signs are shown at a high luminance to improve the manipulating property of the knob device.

9 Claims, 1 Drawing Sheet

ILLUMINATED KNOB DEVICE

BACKGROUND OF THE INVENTION

1. Field of the Invention

The present invention relates to an illuminated knob device for audio equipment of a motor vehicle or for the like.

2. Description of the Background Art

FIG. 2 is a sectional view of a conventional illuminated knob device disclosed in Unexamined Japan Utility Model Application No. 24232/91. The device includes an illuminated knob 11, the rotary shaft 12*a* of a variable resistor and switch 12, and a light emission diode 13. The knob 11 has a light guide portion 11*a*, a light bending portion 11*b*, and an outer luminous portion 11*c*, and is fitted on the rotary shaft 12*a*. The diode 13 is attached to the resistor and switch 12 mounted on a printed circuit board 14. Rays of light are emitted from the diode 13, transmitted through the light guide portion 11*a*, reflected by the light bending portion 11*b*, and irradiated upon the outer luminous portion 11*c* to illuminate it.

Since the illuminated knob 11 is rotated synchronously with the rotary shaft 12*a*, only one point can be illuminated in the outer luminous portion 11*c*. This is a problem. Since the light emission diode 13 is located in a fixed position, the luminance of the luminous portion 11*c* varies from rotation angle to rotation angle. This is also a problem.

SUMMARY OF THE INVENTION

The present invention was made in order to solve the above-mentioned problems. Accordingly, it is an object of the invention to provide an illuminated knob device with is improved manipulating properties and on the luminous portion of which the function of a variable resistor and switch and the method of manipulation thereof can be clearly shown by illuminating the portion.

The device includes an inner unrotatable shaft and an outer rotatable shaft of the variable resistor and switch, a first manipulation member fitted on the inner unrotatable shaft and having the luminous portion provided with signs for showing the function of the resistor and switch and the method of manipulation thereof, and a second manipulation member fitted on the outer rotatable shaft.

In the illuminated knob device provided in accordance with the present invention, the manipulation method indicating sign and the function indicating sign are shown on the design surface of the luminous portion of the first manipulation member fitted on the inner unrotatable shaft of the variable resistor and switch. The resistor and switch can be manipulated with the second manipulation member fitted on the outer rotatable shaft of the resistor and switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

An embodiment of the present invention is hereafter described with reference to the drawings attached hereto.

Figure 1A:
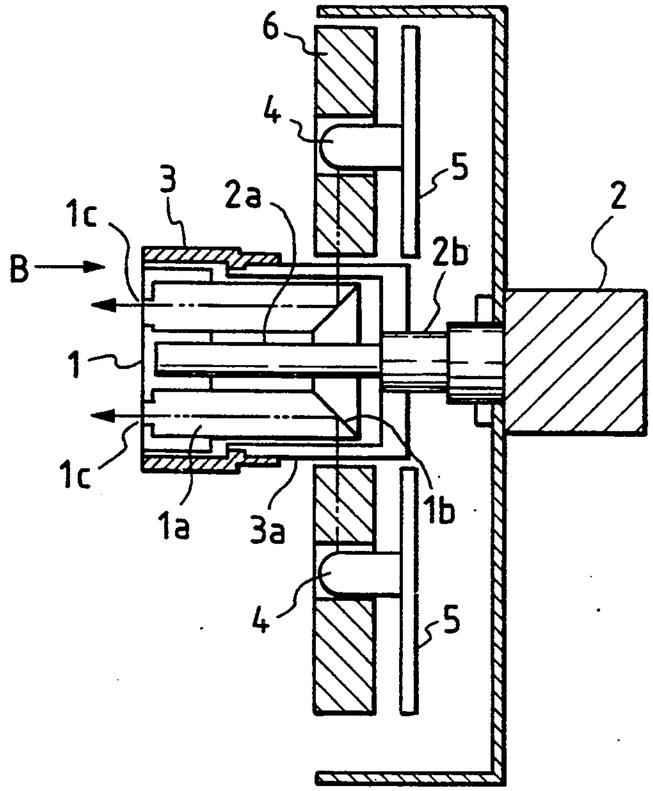
FIG. 1(A) is a sectional view of an illuminated knob device which is an embodiment of the present invention.
Figure 1B:
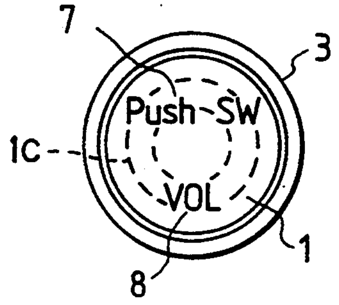
FIG. 1(B) is a partial front view of the device in a direction B shown in FIG. 1(A)
Figure 2:
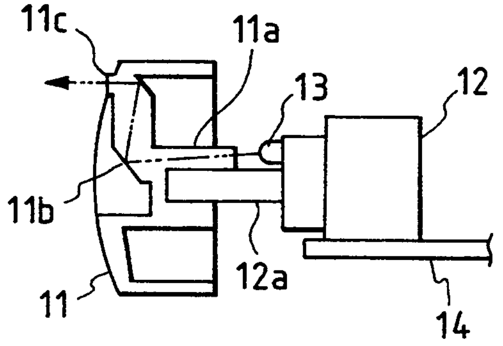
FIG. 2 PRIOR ART
FIG. 2 is a sectional view of a conventional illuminated knob device.

FIG. 1(A) shows an illuminated knob device. The device includes a first manipulation member 1, the inner unrotatable shaft 2*a* and outer rotatable shaft 2*b* of a variable resistor and switch 2, a second manipulation member 3, light sources 4, and a light guide 6. The first manipulation member 1 has a light guide portion 1*a*, a light bending portion 1*b* and a luminous portion 1*c* integrally formed together, and is fitted on the inner unrotatable shaft 2*a* of the resistor and switch 2. The second manipulation member 3 surrounds the first manipulation member 1, and is fitted on the outer rotatable shaft 2*b* of the resistor and switch 2. The light sources 4 are attached to a printed circuit board 5, and put in the light guide 6. The second manipulation member 3 has a transparent portion 3*a* formed integrally with the other portion of the member. The reference numerals 7 and 8 designate operation characters and function characters which are provided on the outer surface of the first manipulation member 1.

Rays of light are emitted from the light sources 4 into the light guide 6 so that the rays of light pass through the light guide 6 to reach the second manipulation member 3. Succeedingly, the rays of light are reflected by the light bending portion 1*b* of the first manipulation member 1 so that the rays of light travel through the light guide portion 1*a* and reach the luminous portion 1*c* to illuminate it to make the characters 7 and 8 clearly visible, To whatever angle the outer rotatable shaft 2*b* coupled to the second manipulation member 3 is rotated therewith, the rays of light are transmitted through the transparent portion 3*a* of the member so that the luminous portion 1*c* of the first manipulation member 1 is illuminated by the rays of light.

Since the device includes only one light bending portion 1*b*, the quantity of rays of light which are damped to not reach the luminous portion 1*c* is reduced to heighten the luminance thereof. Besides, some rays of light can be taken out from the light guide 6 to illuminate the second manipulation member 3 to make the presence thereof clearly visible.

An illuminated knob device provided in accordance with the present invention includes the mutually different shafts of a variable resistor and switch, a first manipulation member having a light guide portion, and a second manipulation member having a transparent portion, so that the method of manipulation of the resistor and switch and the function thereof can be clearly shown. It is thus attained to much improve the manipulating property of the device and make the design thereof novel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An illuminated knob comprising:
an inner light source for illuminating the illuminated knob to show characters of the illuminated knob;
a first manipulation member fitted on an inner fixed shaft of the illuminated knob, said first manipulation member including an outer member indicating said characters and including an inner member, said inner member having a light bending portion for bending rays of light generated by said inner light source and a light guide portion for transmitting said rays of light to illuminate said outer member; and
a second manipulation member fitted on a rotatable outer shaft which is disposed around said inner fixed shaft, said second manipulation member having a transparent portion through which said rays of light are transmitted.

2. The illuminated knob as claimed in claim 1, wherein said inner light source is disposed around said rotatable outer shaft.

3. The illuminated know as claimed in claim 1, wherein said light bending portion of said first manipulation member comprises a reflector.

4. An illuminated knob comprising:
an inner fixed shaft, operatively coupled to variable resistor/switch means, for switching said variable resistor/switch means on and off upon being depressed;
an outer rotatable shaft, operatively coupled to said variable resistor/switch means and disposed around said inner fixed shaft, for varying a resistive value of said variable resistor/switch means upon being rotated;
a light source mounted peripherally of the illuminated knob for illuminating the illuminated knob;
an inner knob portion, fixed to said inner fixed shaft, having an outer transparent top with characters thereon and a base portion including a light bending portion for bending light rays from said light source through a light guide portion towards said outer transparent top; and
an outer knob portion fixed to said outer rotatable shaft and rotatingly disposed around said inner knob portion, said outer knob portion having a transparent portion through which the light rays pass from said light source to said light bending portion to illuminate said outer transparent top of said inner knob portion.

5. The illuminated knob of claim 4, further comprising an additional light source mounted peripherally of the illuminated knob for illuminating the illuminated knob,
said inner knob having an additional base portion including an additional light bending portion for bending light rays from said additional light source through an additional light guide portion towards said outer transparent top.

6. The illuminated knob of claim 5, wherein said additional light source is mounted 180 degrees around the circumference of the illuminated knob from said light source.

7. The illuminated knob of claim 6, wherein said light source and said additional light source are mounted within respective light guides which guide the light rays to said light bending portion and said additional light bending portion.

8. The illuminated knob of claim 4, wherein said light bending portion is a reflector.

9. The illuminated knob of claim 8, wherein said light source is mounted substantially coaxially with said light bending portion.

* * * * *